March 28, 1961  O. A. MAUNULA  2,977,012
LOADING GUIDE FOR BOAT TRAILERS
Filed April 30, 1959
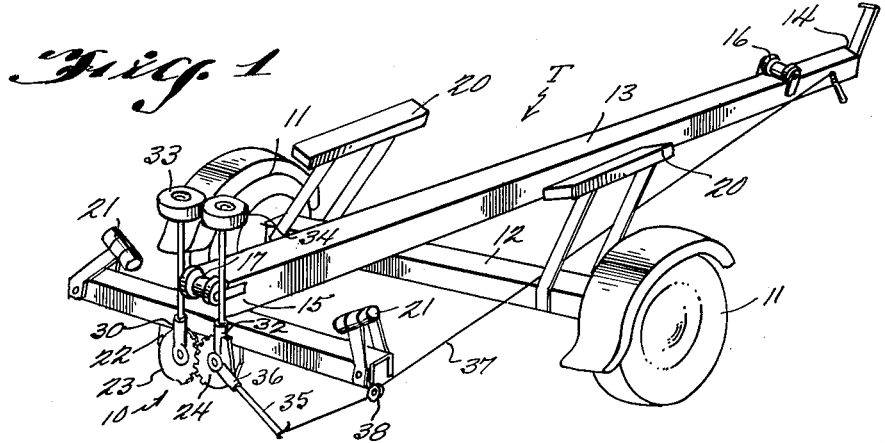
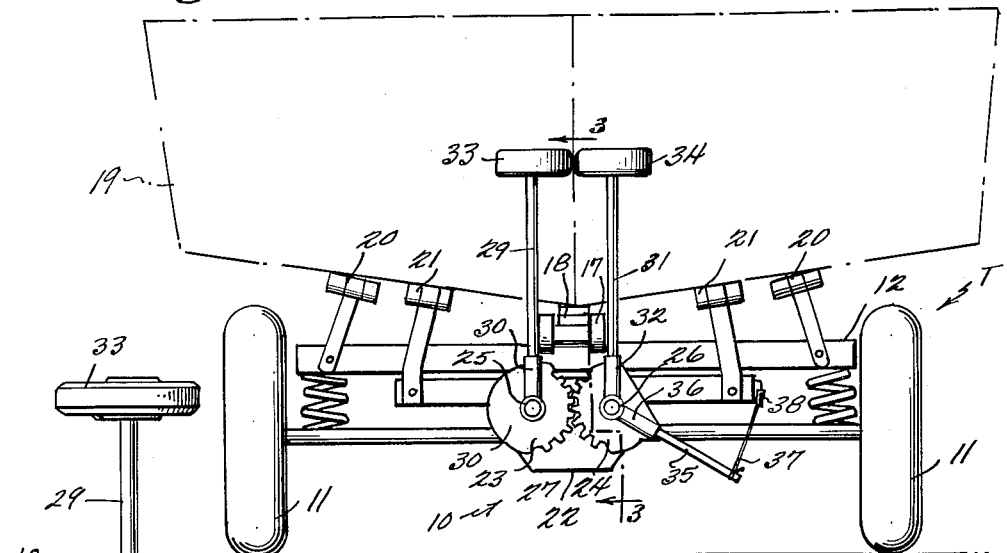
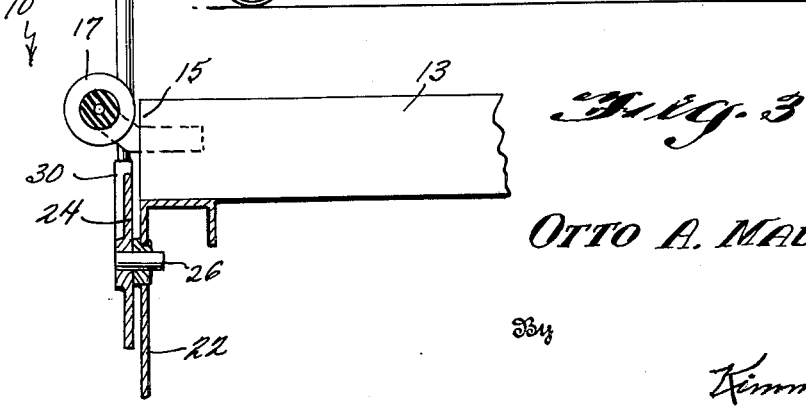
Inventor
OTTO A. MAUNULA
By
Kimmel & Crowell
ATTORNEYS

United States Patent Office 2,977,012
Patented Mar. 28, 1961

2,977,012

LOADING GUIDE FOR BOAT TRAILERS

Otto A. Maunula, 413 Gilbert Ave., Menlo Park, Calif.

Filed Apr. 30, 1959, Ser. No. 810,080

4 Claims. (Cl. 214—505)

The present invention relates to a loading guide for boat trailers, particularly for guiding the boat during the loading of the boat on the trailer.

The primary object of the invention is to provide a guide for maintaining a boat in centered position while loading the boat on a trailer.

Another object of the invention is to provide a guide of the class described above which is adjustably mounted on the trailer to accommodate boats of varying widths and maintaining them in centered position on the trailer during a loading operation.

A further object of the invention is to provide a loading guide of the class described above wherein opposed guide members are arranged for equal and opposite movement under the control of the operator.

A still further object of the invention is to provide a boat guide for trailers of the class described above which is inexpensive to manufacture, simple to use and which can be secured to the trailer without major modification of the trailer.

Other objects and advantages will become apparent in the following specification when considered in light of the attached drawings, in which:

Figure 1 is a perspective view of the invention shown attached to a boat trailer;

Figure 2 is an end elevation of the invention shown attached to a boat trailer; and Figure 3 is a vertical sectional view taken along the line 3—3 of Figure 2, looking in the direction of the arrows.

Referring now to the drawings in detail wherein like reference characters indicate like parts throughout the several figures, the reference numeral 10 indicates generally a guide structure shown attached to a boat trailer, generally indicated at T.

The trailer T has a pair of wheels 11 arranged in spaced parallel relation and supported on a transverse frame member 12 extending therebetween. An elongated tongue 13 is arranged intermediate the wheels 11 and terminates in a trailer hitch 14 at its forward end. The tongue 13 has the rear end 15 thereof positioned rearwardly of the transverse member 12. A grooved roller 16 is mounted adjacent the forward end of the tongue 13 and a second grooved roller 17 is mounted adjacent the rear end of the tongue 13 and the keel 18 of a boat 19 is supported on the grooved rollers 16, 17 when the boat 19 is being loaded on the trailer T and after it has been loaded thereon.

The boat 19 is further supported on chocks 20 and on lateral rollers 21, all in a conventional manner.

In loading a boat on a trailer T, the keel 18 must be aligned with the rollers 16, 17 so that the keel 18 will overlie the tongue 13 throughout its length. A guide structure, generally indicated at 10, is mounted on the rear end of the tongue 13 and includes a bracket 22 depending vertically from the rear end 15 of the tongue 13. A pair of plates 23, 24 are mounted on the bracket 22 by means of pivot pins 25, 26 arranged in spaced parallel horizontal relation. The plates 23, 24 have cooperating arcuately arranged gear teeth 27, 28 which are meshed so that pivotal movement of either the plate 23 or the plate 24 causes the opposite plate to rotate a corresponding but opposite amount.

A shaft 29 is mounted in a socket 30 formed on the plate 23 and a second shaft 31 is mounted in a socket 32 formed on the plate 24. The shafts 29, 31 have rubber tired guide wheels 33, 34 journalled respectively on the ends thereof opposite the sockets 30, 32.

An arm 35 projects downwardly from a socket 36 formed on the plate 24. The socket 36 has its axis sloping downwardly from the axis of the socket 32. A control cable 37 is secured to the lower end of the arm 35 and extends through a pulley 38 toward the forward end of the tongue 13 where its movement is controlled by any suitable means, such as a lever 40, so as to maintain the guide wheels 33, 34 in guiding relation to the boat 19 during the loading and launching thereof.

It should be noted that the guide wheels 33, 34 are adapted to engage the boat 19 on opposite sides of the bow which is initially centered between them, and then to spread gradually apart as the boat 19 moves forwardly on the trailer T until the rollers 33, 34 assume a supporting position underlying the rear portion of the boat 19.

Having thus described the preferred embodiments of the invention, it should be understood that numerous structural modifications and adaptations may be resorted to without departing from the scope of the appended claims.

What is claimed is:

1. A guide apparatus for a boat trailer of the type including an elongated tongue carried by a centrally positioned wheeled supporting frame comprising a bracket depending from the rear end of said tongue, a pair of plates rotatably secured to said bracket, means on said plates interengaging to rotate said plates equally and oppositely of each other, a pair of shafts mounted on said plates, and a pair of guide wheels journalled on said shafts.

2. A guide apparatus for boat trailers of the type including an elongated tongue carried by a centrally positioned wheeled supporting frame, comprising a bracket depending from the rear end of said tongue, a pair of plates rotatably mounted on said bracket, meshing arcuate gear segments formed on said plates, a pair of upstanding shafts secured to said plates, and a pair of guide rollers journalled on the upper ends of said shafts.

3. A device as claimed in claim 2 wherein means are provided for normally maintaining said guide rollers in closely spaced relation.

4. A device as claimed in claim 3 wherein said last named means comprises a cable and means securing said cable to one of said plates.

References Cited in the file of this patent

UNITED STATES PATENTS

| | | |
|---|---|---|
| 2,676,716 | Sallis | Apr. 27, 1954 |
| 2,708,045 | Shontz | May 10, 1955 |